United States Patent [19]

Maki

[11] Patent Number: 5,195,793
[45] Date of Patent: Mar. 23, 1993

[54] MOLDING FOR AUTOMOBILE
[75] Inventor: Renji Maki, Tochigi, Japan
[73] Assignee: Tokai Kogyo Kabushiki Kaisha, Ohbu, Japan
[21] Appl. No.: 788,377
[22] Filed: Nov. 6, 1991
[30] Foreign Application Priority Data
   Nov. 7, 1990 [JP] Japan ................. 2-117093[U]
[51] Int. Cl.$^5$ ............................................. B60B 19/42
[52] U.S. Cl. ................................. 293/155; 24/297; 52/717.1; 293/128
[58] Field of Search ............... 293/102, 126, 128, 142, 293/155; 52/716, 717.1, 718.1; 24/295, 297, 453, 563

[56] References Cited
U.S. PATENT DOCUMENTS
3,841,682 10/1974 Church et al. ................. 293/142
4,917,426 4/1990 Copp ............................. 293/142
5,100,188 3/1992 Stieg ........................... 293/155 X FOREIGN PATENT DOCUMENTS
101853 6/1983 Japan ............................. 293/102

Primary Examiner—Charles A. Marmor
Assistant Examiner—Andrew C. Pike
Attorney, Agent, or Firm—Oblon, Spivak, McClelland, Maier & Neustadt

[57] ABSTRACT

An automobile molding can be satisfactorily mounted on a vehicle body panel of an automobile without forming several holes in the vehicle body. With the use of such an arrangement that a locating boss incorporated with a holder is inserted together with a clip in an attaching hole formed in the vehicle body panel so as to effect an engaging force between the locating boss and the attaching hole, which prevents the holer and the molding body from being positionally shifted.

5 Claims, 3 Drawing Sheets

MOLDING FOR AUTOMOBILE

FIELD OF THE INVENTION

The present invention relates to a molding for automobiles, which is adapted to be mounted to a vehicle body panel of an automobile by means of clips.

DESCRIPTION OF THE PRIOR ART

Various kinds of moldings including side protecting moldings are mounted to panels of the vehicle body of an automobile. These automobile moldings are attached by engaging holders attached to the rear surfaces of the moldings, with clips fitted in attaching holes formed in the vehicle body panels of the automobile. Explanation will be made hereinbelow of a conventional automobile molding of such kinds with reference to FIGS. 6 to 8.

Referring to these drawings, a clip 3 is fitted in an attaching hole 2 which is formed in a vehicle body panel 1. A holder 5 attached to the rear surface of a molding body 4 having a long length is engaged with the above-mentioned clip 3.

Further, the above-mentioned clip 3 is composed of a fitting part 3a adapted to be inserted into the attaching hole 2 in the vehicle body panel 1, a support plate 3b held on the outside (the upper side in FIG. 7) of the vehicle body panel 1, and adapted to be fitted in a clip receiving groove 5a.

The above-mentioned clip receiving groove 5a extends in the longitudinal direction of the molding body 4, having, at its one end, an opening through which the above-mentioned support plate 3b is inserted and is made to abut against the other end side of the groove 5a which is closed. A pair of saw tooth-like locking step parts 5b, 5b are formed being opposed to each other at the opening of the clip receiving groove 5a, and these locking step parts 5b, 5b are adapted to be engaged with an engaging part 3c of the clip 3 so that the molding body 4 is located in position while it is prevented from coming off.

In the arrangement of the automobile molding as mentioned above, it is required that the space between the locking step parts 5b, 5b formed at the opening of the holder 5 is made to be small in order to ensure a high holding force for the molding body 4. However, should the space between the locking step parts 5b, 5b become smaller, a larger force would be required for engaging the locking step parts 5b, 5b with the engaging part 3c of the clip 3, resulting in difficulty in the attachment of the molding body 4.

In order to solve the above-mentioned problem, there has been proposed such an arrangement that a locating boss 6, as shown in FIG. 7, planted upright on the back surface of the molding body 4 is inserted, with its one end part, in a locating hole 7 formed in the vehicle body panel 1 so as to prevent the molding body from being positionally shifted. However, this arrangement is unpreferable since several holes should be formed in the vehicle body panel, encountering a problem in sealability and increases in the number of necessary components and in man-hours, resulting in lowering of the productivity.

SUMMARY OF THE INVENTION

One object of the present invention is to provide an automobile molding which can maintain a satisfactory degree of mountability without forming a large number of holes in the vehicle body panel.

In order to achieve the above-mentioned object, according to the first aspect of the present invention, there is provided an automobile molding including a molding body adapted to be attached to a vehicle body panel by engaging a holder provided to the rear surface of the molding body with a clip fitted in an attaching hole formed in the vehicle body panel, wherein a locating boss is integrally incorporated with the holder on the molding body, and is adapted to be inserted in the attaching hole in the vehicle body panel so as to lock the molding body in order to prevent the same from coming off.

Further, according to the second aspect of the present invention, in addition to the arrangement given by the first aspect of the present invention, the holder on the molding body is formed therein with a clip-receiving groove extending longitudinally of the molding body and having one end opened and the other end closed, and the above-mentioned locating boss is arranged adjacent to the closed end side of the clip-receiving groove.

With this arrangement as mentioned above, the clip and the locating boss on the holder are inserted simultaneously into the attaching hole in the vehicle body panel so as to exhibit an engaging force between the locating boss and the attaching hole, which can prevent the holder and as well the molding body from being positionally shifted.

In view of the above-mentioned arrangement according to the present invention, a satisfactory degree of mountability can be ensured without forming a large number of holes in the vehicle body panel while the attachment of the molding body can be facilitated, and the number of necessary components and the man-hours can be reduced so as to enhance the productivity.

BRIEF DESCRIPTION OF THE DRAWINGS

FIGS. 1 to 5 are views illustrating an attachment structure of an automobile molding in an embodiment form of the present invention, among which FIG. 1 is a longitudinally sectional view along line I—I in FIG. 2, FIG. 2 is a front view, FIG. 3 is a cross-sectional view along line III—III in FIG. 2, FIG. 4 is a bottom view, and FIG. 5 is a perspective view; and FIGS. 6 to 8 are views illustrating an attachment structure of a conventional automobile molding, among which FIG. 6 is a front view, FIG. 7 is a longitudinally sectional view along line IV—IV, and FIG. 8 is a perspective view.

DESCRIPTION OF THE PREFERRED EMBODIMENTS

Explanation will be hereinbelow made of an embodiment of the present invention.

Figure 1:
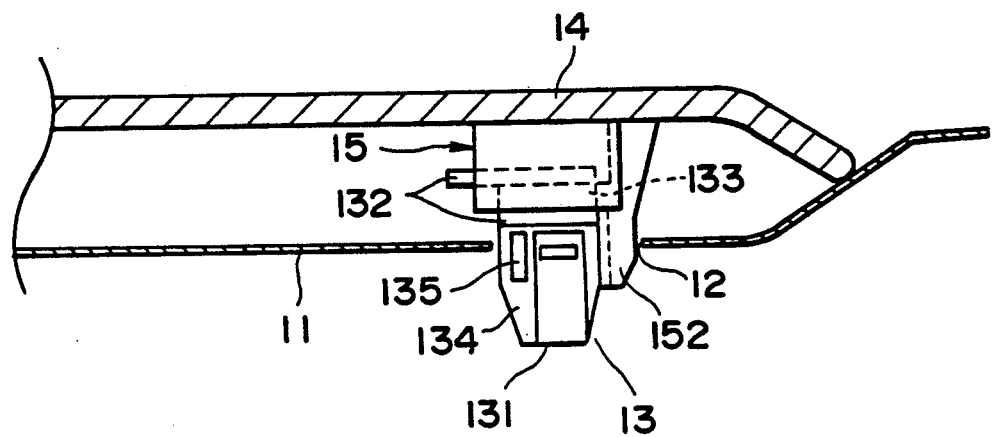
Figure 2:
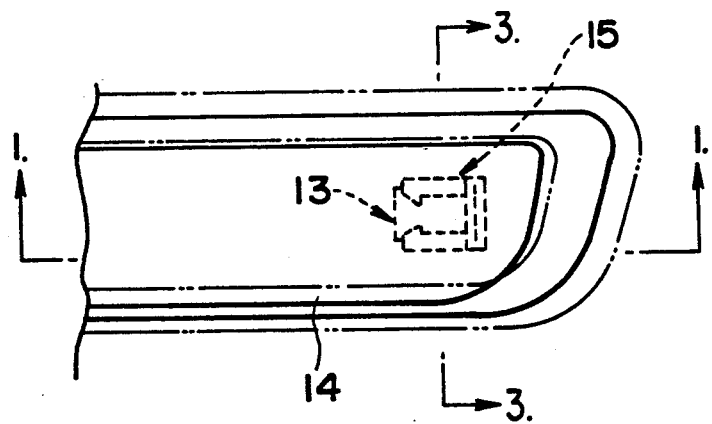
Figure 3:
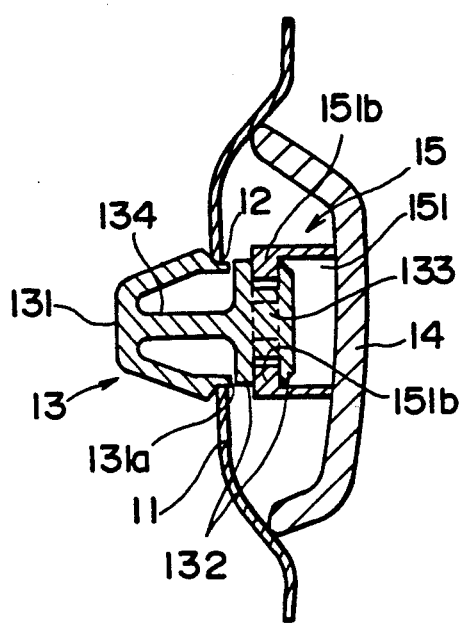
Figure 4:
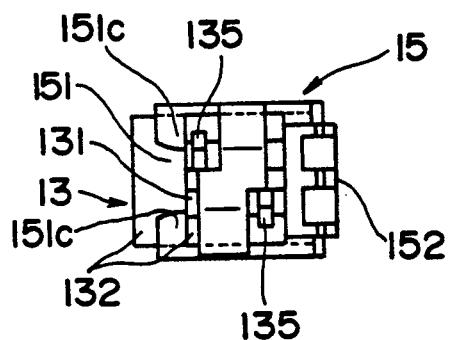
Figure 5:
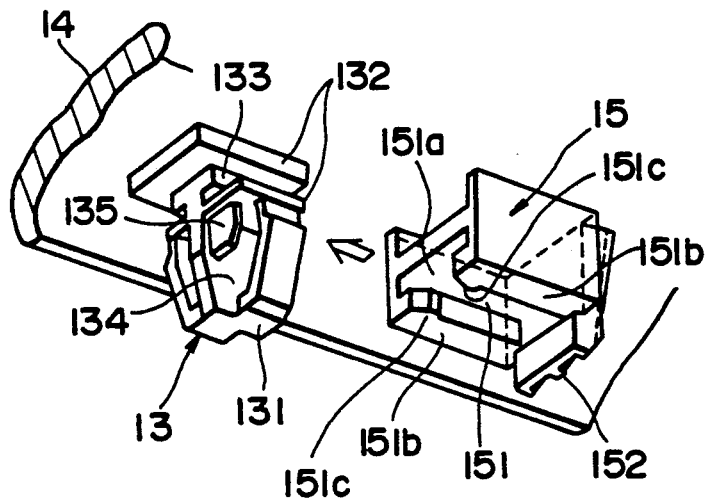
Figure 6:
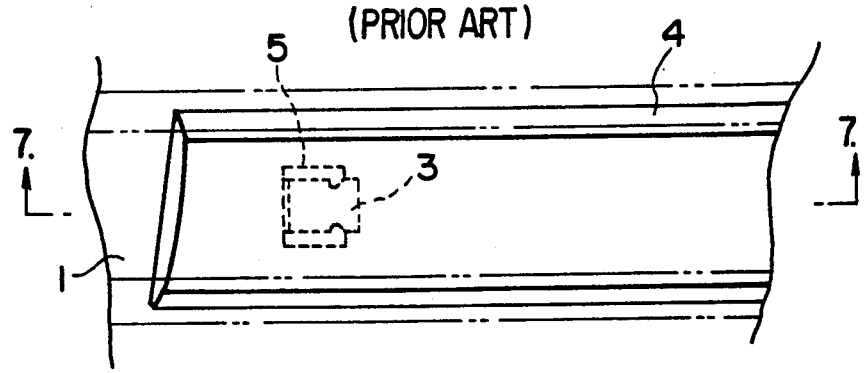
Figure 7:
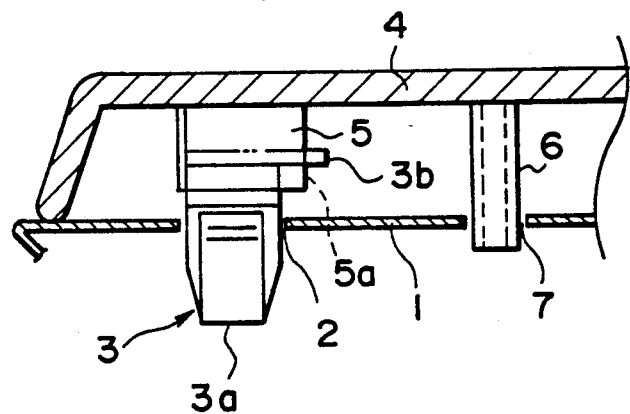
Figure 8:
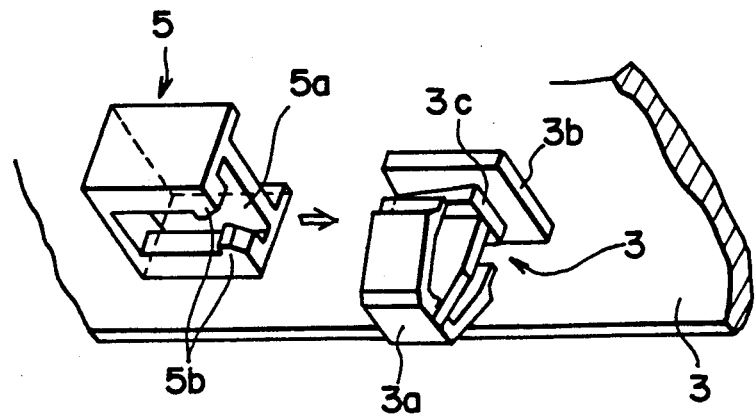

FIGS. 1 to 5 shows one embodiment in which the present invention is applied to a side protect molding for an automobile.

Referring to FIGS. 1 to 5, a molding attaching hole 12 is formed in a vehicle body panel 11, piercing through the latter, and a clip 13 is fitted in this molding attaching hole 12. Meanwhile, a holder 15 is integrally incorporated with a molding body on the rear surface side of the latter. The clip 13 is engaged and locked in this holder 15.

The clip 13 is composed of a fitting part 131 adapted to be inserted and locked in the molding attaching hole 12 in the vehicle body panel 11, a pair of support plates 132, 132 extending from the fitting part 131 and held being projected outward from the vehicle body panel 11, and an engaging plate 133 formed between the pair of supporting plates 132, 132, the fitting part 131 and the support plates 132 being connected to each other by means of a planar pillar plate 134 extending longitudinally of the molding body 14. Further, one of the support plates 132 is adapted to be fitted in a clip-receiving groove 151 formed in the holder 15.

The fitting part 131 is projected outward from the front end edge part of the pillar plate 134 on both sides thereof and is bifurcated being slightly opened toward the support plates 132, that is, the fitting part 131 has an arrowhead shape, and a step part 131a formed in each of the front end edge parts of the fitting part 131 is pressed against and locked to the attaching hole 12 in the vehicle body panel 11. Further, auxiliary plates 134, 134 are projected from both side face parts of the pillar plate 134.

Meanwhile, the clip-receiving groove 151 in the holder 15 is extended in the longitudinal direction of the molding body 14 having a C-like cross-sectional shape, and one of the support plates 132 of the clip 13 is adapted to be inserted in the clip-receiving groove 151 through an opening 151a which is formed at one longitudinal end. The longitudinally inward part of the clip-receiving groove 151 is closed by a wall surface against which the front end face part of the support plate 132 abuts. A pair of planar piece parts 151b, 151b are formed at parts corresponding to both groove edges of the clip-receiving groove 151, for guiding the engaged support plates 132. These planar piece parts 151b, 151b are adapted to be fitted and held between the support plates 132, 132 of the clip 13.

Further, the planar piece parts 151b, 151b are formed at the opening end with saw tooth-like locking step parts 151c, 151c which are opposed to each other. On the contrary, the engaging plate 133 of the clip 13 is formed in a wedge shape, having a wide end face part which is formed on the afterward side of the engaging plate 133 in the direction of insertion and which is adapted to be fitted between the locking step parts 151c, 151c of the holder 15, and accordingly, the molding body 14 is located in position, being prevented from coming off.

Further, the longitudinally inward end face part of the holder 15 is integrally incorporated with a locating boss 152 for preventing the molding body 14 from coming off. This locating boss 152 is adjacent to the inward closing wall of the clip-receiving groove 151, and is projected by a predetermined length therefrom in order to be inserted in the attaching hole 12 in the vehicle body panel 11. That is, this projected end part of the locating boss 152 is inserted, similar to the fitting part 131 of the clip 13, in the attaching hole 12 in the vehicle body panel 11.

Fitting arrangement of the above-mentioned clip 13 and holder 15 is such that pairs of the combinations of the clip 13 and holder 15 are each arranged symmetrically at predetermined intervals in the longitudinal direction of the molding body 14.

In the above-mentioned embodiments, the locating boss 152 of the holder 15 is inserted in the attaching hole 12 in the vehicle body panel 11 in which the fitting part 131 of the clip is fitted, being adjacent to the fitting part 131. Accordingly, even through the molding body 14 is exerted with a force acting in the direction toward the right of FIG. 1 in which the holder 15 comes out from the attaching hole 12, the holder 15 and the molding body 14 can be prevented from coming off since the locating boss 152 of the holder 15 abuts against the attaching hole 12. Further, this structure is symmetrically arranged in the longitudinal direction of the molding body 14, and accordingly, the molding body 14 is held in position without being positionally shifted in either directions longitudinal thereof. Meanwhile, in the case of no locating boss, the molding body 14 is located in position only by an abutting and fitting force between the locking step parts 151c, 151c of the holder 15 and the engaging plate 133 of the clip, and accordingly, it is necessary to make the space between the locking step parts 151c, 151c small, as in the conventional arrangement, in order to prevent the molding body 14 from being positionally shifted. However, in the above-mentioned embodiment, since the holder 15 is located in position by means of the locating boss 152 integrally incorporated with the holder 15, the space between the locking step parts 151c, 151c can be increased so as to decrease the locking force thereof. Accordingly, with the arrangement shown in this embodiment, it is possible to facilitate the engagement of the locking step parts 151c, 151c with the engaging part 13c of the clip 13.

What I claim is:

1. An automobile molding including a molding body having a rear surface;

a clip means for fitting in an attaching hole formed in a vehicle body panel of an automobile; and a holder provided on the rear surface of said molding body and engageable with said clip means, for mounting said molding body; wherein said holder is integrally incorporated with a locating boss insertable into said attaching hole in said vehicle body panel so as to prevent said molding body from being positionally shifted;

said holder on said molding body is formed therein with a clip-receiving groove extending longitudinally of said molding body and having one end opened and another end closed, and said locating boss is arranged adjacent to the closed end of said clip-receiving groove.

2. A vehicle molding strip extending in a longitudinal direction, said molding strip comprising:

a holder carried on a rear surface of said molding strip, said holder having a clip-receiving groove formed therein;

a clip including a support plate and an elastically compressible fitting part, said clip being securable within said holder by sliding said support plate into said clip receiving groove in the longitudinal direction of said molding strip; and a locating boss integrally incorporated with said holder such that, when said support plate is fully inserted into said clip receiving groove, said elastically compressible fitting part and said locating boss are insertable in combination with one another through a molding attaching hole in a vehicle body panel to secure the molding strip to the vehicle body panel, said elastically compressible fitting part expanding to prevent removal of the clip from the molding attaching hole, and the locating boss abutting against an edge of the molding attaching hole to prevent the molding strip from sliding relative to the vehicle body panel in said longitudinal direction.

3. The vehicle molding strip according to claim 2, wherein said clip further includes a wedge-shaped engaging plate and wherein said holder further includes a pair of resiliently biased saw tooth-like locking step parts which engage with said wedge-shaped engaging plate to restrain said clip from sliding relative to said holder when said support plate is fully inserted into said clip receiving groove.

4. The vehicle molding strip according to claim 2, wherein said molding strip includes a plurality of holders arranged symmetrically at predetermined intervals along the longitudinal direction of the molding strip.

5. The vehicle molding strip according to claim 4, wherein a clip is retained in each of said holders.